(12) United States Patent
Sharma et al.

(10) Patent No.: US 11,270,062 B2
(45) Date of Patent: Mar. 8, 2022

(54) SYSTEM AND METHOD FOR AUTOMATED CONTENT ANNOTATION WORKFLOW

(71) Applicant: Labelbox, Inc., San Francisco, CA (US)

(72) Inventors: Manu Sharma, San Francisco, CA (US); Brian Rieger, San Francisco, CA (US); Dan Rasmuson, San Francisco, CA (US); Connor Harwood, San Francisco, CA (US); Ryan Quinn, San Francisco, CA (US); Kyle Owens, San Francisco, CA (US); Randall Lin, San Francisco, CA (US)

(73) Assignee: LABELBOX, INC., San Francisco, CA (US)

( * ) Notice: Subject to any disclaimer, the term of this patent is extended or adjusted under 35 U.S.C. 154(b) by 0 days.

(21) Appl. No.: 16/993,669

(22) Filed: Aug. 14, 2020

(65) Prior Publication Data

US 2022/0019729 A1   Jan. 20, 2022

Related U.S. Application Data

(60) Provisional application No. 63/054,112, filed on Jul. 20, 2020.

(51) Int. Cl.
*G06F 40/169* (2020.01)
(52) U.S. Cl.
CPC .................. *G06F 40/169* (2020.01)
(58) Field of Classification Search
CPC .................................................. G06F 40/169
See application file for complete search history.

(56) References Cited

U.S. PATENT DOCUMENTS

| | | | |
|---|---|---|---|
| 8,190,990 B2 | 5/2012 | Le | |
| 8,713,703 B2 | 4/2014 | Fisk | |
| 9,183,447 B1 | 11/2015 | Gdalyahu | |
| 9,225,531 B2 | 12/2015 | Hachey | |
| 9,990,687 B1 | 6/2018 | Kaufhold | |
| 10,169,678 B1* | 1/2019 | Sachdeva | G05D 1/0221 |
| 10,360,257 B2 | 7/2019 | Hou | |
| 2010/0174603 A1 | 7/2010 | Hughes | |
| 2011/0007964 A1* | 1/2011 | Saund | G06K 9/6254 |
| | | | 382/162 |
| 2013/0346356 A1 | 12/2013 | Welinder | |
| 2017/0185670 A1 | 6/2017 | Dua | |
| 2017/0185869 A1 | 6/2017 | Dua | |
| 2019/0026278 A1* | 1/2019 | Abedin | G06F 16/434 |
| 2019/0050428 A1* | 2/2019 | Hou | G06F 40/169 |
| 2019/0228262 A1* | 7/2019 | Gonzalez | A63F 13/2145 |
| 2019/0318165 A1* | 10/2019 | Shah | G06F 3/0482 |
| 2020/0293712 A1* | 9/2020 | Potts | G06F 40/169 |
| 2021/0035015 A1* | 2/2021 | Edgar | G06K 9/6257 |

\* cited by examiner

*Primary Examiner* — Asher D Kells
(74) *Attorney, Agent, or Firm* — Inventive Law Inc.; Jim H. Salter

(57) ABSTRACT

An automated content annotation workflow is disclosed. An example embodiment is configured for: registering a plurality of labelers to which annotation tasks are assigned; populating a labeling queue with content data to be annotated; assigning annotation tasks from the labeling queue to the plurality of labelers; enabling the plurality of labelers in an annotation review queue to modify or delete annotations applied by prior labelers; and evaluating a level of performance of the plurality of labelers in applying the annotations.

20 Claims, 12 Drawing Sheets

SYSTEM AND METHOD FOR AUTOMATED CONTENT ANNOTATION WORKFLOW

PRIORITY PATENT APPLICATION

This non-provisional patent application draws priority from U.S. provisional patent application Ser. No. 63/054,112; filed Jul. 20, 2020. The entire disclosure of the referenced patent application is considered part of the disclosure of the present application and is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2019-2020, Labelbox, Inc., All Rights Reserved.

TECHNICAL FIELD

This patent document pertains generally to data processing, machine learning and artificial intelligence (AI) systems, content annotation, data communication networks, and more particularly, but not by way of limitation, to a system and method for automated content annotation workflow.

BACKGROUND

Machine learning and artificial intelligence (AI) systems are becoming increasingly popular and useful for processing data and augmenting or automating human decision making in a variety of applications. For example, images and image analysis are increasingly being used for autonomous vehicle control and simulation, among many other uses. Images are one form of content data or assets that can be used to train an AI system. Other AI applications can include other transportation applications, medical, agriculture, insurance, manufacturing, finance, construction, and many others. Other forms of content data or assets used to train an AI system in these applications can include images, textual content, numerical content, audio data, chemical or organic signatures, and the like. However, AI systems only operate as well as the content data on which they are trained. An improperly or insufficiently trained AI system can create significant problems if deployed in a real-world operational environment. These problems can manifest themselves in at least two ways: lack of training content data, and lack of good quality training content data. Many machine learning algorithms require large amounts of training data before they begin to produce useful results. One example of a machine learning system is a neural network. Neural networks are data processing systems that require copious amounts of training data to become useful for operational deployment.

Producing large volumes of good quality training data for an AI system can be a difficult task. An important aspect of this task, for example when image content is needed for AI system training, is to identify or label objects in sets of received training images or video feeds (assets). The identification and location of objects labeled or annotated in the images can be useful for configuring an AI system. However, it can be very difficult to automate the process of image analysis and object labeling. Variations in image quality, labeler subjectivity, environmental conditions, and data processing capabilities, among other conditions, can hinder the image analysis and object labeling process. One approach for producing training content data is to annotate objects in the training images with one or more labels. The labeled objects can then be classified and further processed to determine location, movement, or other features. This image and object annotation can be performed manually by people who view each image and annotate the objects they see in the images. However, conventional manual approaches to annotating images are time-consuming, financially untenable, and prone to inconsistencies resulting from viewers' subjectivities. Automated approaches have also been developed. These automated approaches can be significantly more efficient than manual ones and can be scaled accordingly. Unfortunately, current automated approaches to annotating images produce many mis-labeled objects. Consequently, it can be very difficult, expensive, and time-consuming, to generate large volumes of good quality training data for an AI system.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

Figure 1:
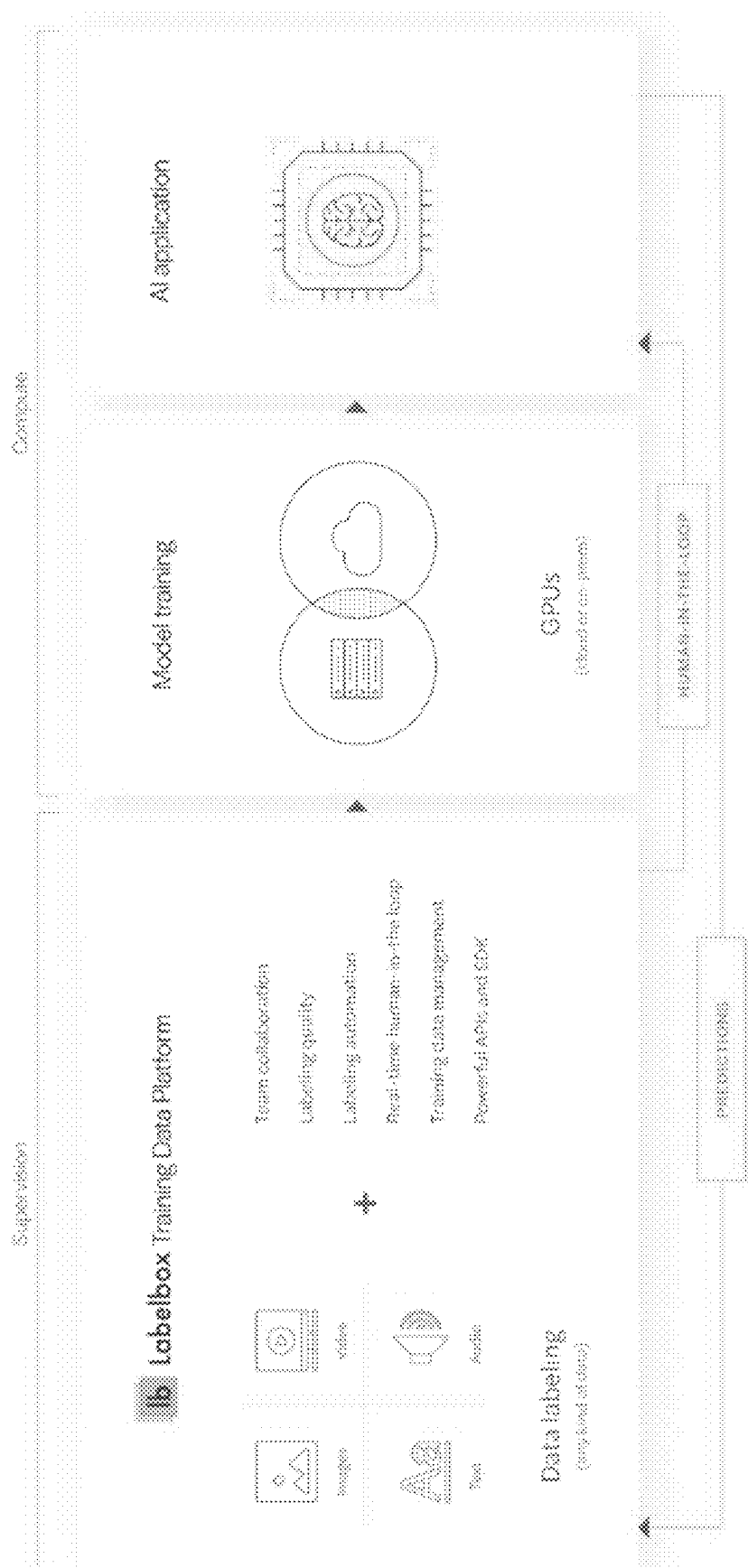
FIG. 1 illustrates an example embodiment of the automated content annotation workflow platform as described herein within an AI ecosystem.

An automated content annotation workflow is disclosed. In the various example embodiments disclosed herein, an automated content annotation workflow system can be implemented to generate enterprise grade training data with fast AI enabled labeling tools, labeling automation, human workforce, data management, and a powerful application programming interface (API) for integration and extensibility. As a result, the example embodiments disclosed herein enable teams to build and operate production grade machine learning systems. FIG. 1 illustrates an example embodiment of the automated content annotation workflow platform as described herein within an AI ecosystem.

In an example embodiment, a user of the automated content annotation workflow system can create a labeling project. Each project is a training data management environment where the user can manage the performance, quality, and progress of the labeling project. In other example embodiments, the user can create a project programmatically using any of a variety of supported computer programming languages.

An example embodiment provides users with several important metrics to assess the progress of a labeling project. A user interface of the automated content annotation workflow system provides a progress table, which shows a variety of project metrics including the quantity of labels submitted, remaining, skipped, and the total percentage completed. A user can also toggle in the user interface between overall (all users contributing to this project) and only the individual user's contributions. A labels created chart in the user interface shows the quantity of labels created over time. A user can toggle in the user interface between a daily, weekly, and monthly view. A training data quality section contains a reviews table, where the user can see the total number of un-reviewed, accepted, declined, or ambiguous labels. A coverage metric shows the proportion of total labeled assets to be reviewed. An object count table shows the total number of counts of each object and its percentage out of the total object counts. For example, if one out of 13 total objects is "Bird" in a labeled dataset, "Bird" would make up 8% of the total objects in the dataset. A dataset can correspond to one or more content data assets. A classification answers chart shows the number of each classification answer in the dataset.

The labels by collaborator metric shows the label count completed by each user. From a labels tab, a user can see activity of labeled images, label predictions on unlabeled images, and the queue of unlabeled images. In an activity table of the user interface, a user can see a complete list of all submitted labels in a project. A user can choose from a dropdown list of filters to narrow down the user's search results. The activity section is also where a user can access an open review feature by clicking on any of the labels in the list.

An example embodiment keeps track of label and review time and displays the timing in two separate columns within the activity table for each data row. The label time column indicates the total time the creator of the label spends viewing or editing an un-submitted label in the labeling interface. The timer starts when the image is fully loaded and stops when the user clicks "skip", "submit", or exits out of the labeling interface. To ensure idle time is not captured, the timer automatically pauses when the user is inactive on the user interface for 30 seconds and resumes when the user interacts with the keyboard or mouse or refreshes the page. If the user goes back to a previous label in the queue, the timer resumes after three seconds and the time is added to the label time for that data row.

A review time column indicates the total time all users who did not create the label view, edit, or review the submitted label in review mode. When an image or other content data undergoes review, the timer starts when the label loads and stops when the user moves on to the next label in the annotation review queue.

The queue table shows the labeling queue, which consists of the following in an example embodiment: 1) unlabeled assets, and 2) assets that had labels, but were deleted because they needed to be relabeled. Assets in the queue are distributed among the registered labelers unless the asset is specifically reserved (indicated by a "Reserved by" field). A reserved asset will become unreserved if it is not labeled within 90 minutes of being reserved. A performance tab metric is where a user can view the average metrics across all labelers or drill down into individual performance for label time or review time.

From a settings tab of the user interface, a user can attach/remove datasets, modify the configuration of the label editor (part of the user interface), manage members, adjust percentage of labels to be reviewed, and delete a project.

In the Datasets section of the user interface, a complete list of datasets a user can attach to and detach from a user's project is shown. Datasets are sets of assets, which can be labeled by the user. To add or remove data rows from a dataset, the user can click on a dataset and select which data rows to add or remove. When a user adds additional assets to a dataset, the dataset will automatically be added to the labeling queue. When a dataset is detached/removed from a project, all labels created against that dataset will remain in the project and all unlabeled data will be removed from the queue.

In a label editor section of the user interface, a user can make modifications to a label editor configuration. From a tools tab of a "Configure editor" window, a user can add and/or edit a user's ontology for the project. A user can also attach labeler instructions by clicking on the instructions tab. Having additional instructions can be helpful if a user has a team of labelers who are working on a more complex labeling project.

In a portion of the user interface related to labeling quality, a user can adjust the percentage of a user project's images that a user would like to be reviewed for quality of the labeling. In an example embodiment, a benchmarks tool is provided as a quality assurance (QA) tool for comparing labels on an asset to a "gold standard" or other pre-defined labeling standard. In the example embodiment, a consensus tool is also provided as a QA tool for comparing a label generated for an asset by a particular user to all other labels generated for the asset by other users. An example embodiment also provides model-assisted or automated labeling for a user's organization. Benchmarks, consensus, and model-assisted labeling are described in more detail below.

Example embodiments also support an ontology feature, which can be important for creating high-quality labeled content data with minimal errors and inconsistencies. In an example embodiment, the ontology is a top-level entity that can be shared or copied across multiple projects, making the ontology useful for making cascading changes across projects or using an existing ontology for a project as a starting point rather than starting from scratch. The ontology contains the objects and classifications for labeling the content data in a specific project. When creating a new project, the user can create an ontology for the new project in one of several ways:

Create a new ontology. Useful if the user is just starting out or needs to create a new ontology completely from scratch.

Use a shared ontology. Useful if the user has multiple projects that need to reference the ontology.

Create a copy of an existing ontology. Useful to enable the user to create a copy of an existing ontology to use as a starting point rather than creating a new ontology completely from scratch.

An example embodiment enables a user to customize a labeling project with a set of customizable entities to create an ontology, which can facilitate the object labeling for the project. These customizable entities and the ontology are described in more detail below.

Once a labeling project is created, the raw content data or assets for the project can be imported into the automated content annotation workflow platform. The example embodiments provide tools to support the content data import process. In a particular embodiment, content data can be imported using manual or programmatic file uploads or JSON (JavaScript Object Notation) file uploads. JSON is a lightweight data-interchange format that is easy for humans to read and write and easy for machines to parse and generate. The example embodiment enables use of a JSON file to specify all of the import information in the JSON file, such as metadata, queue placement, and external identifier (ID).

After the labeling project has been populated with content data, a user interface of the automated content annotation workflow platform can prompt a user to begin processing through the content data and apply labels to objects identified in the content data. Tool bars enable the user to easily select an object class appropriate for the item identified in the content data. An objects menu shows all the objects the user has used to label the content data. An activity section of the user interface displays the user's level of progress and labeling performance for all of the content data the user has already labeled. Object labels provided by the user can be submitted or exported in a variety of formats via the automated content annotation workflow platform.

An example embodiment provides a members feature that allows a user to invite other individual users and to set the permission settings for each member. If multiple users are collaborating on a project, the automated content annotation workflow platform can distribute the data to the members with the appropriate access. Members typically get unique content data for labeling. Multiple users can be enabled access to the same content data to label the same data if the auto consensus feature (described below) is activated. The benefits of adding members include: projects are completed faster, projects are diversified across multiple labelers, the performance of individual users can be monitored and managed, and the auto consensus feature can be used to compare the agreement for each of the labels across the multiple labelers and calculate a consensus score. Auto consensus works in real time so users can take immediate and corrective actions towards improving their training data and model performance.

After one or multiple users have provided labels for particular content data, an example embodiment of the automated content annotation workflow platform provides tools and management of an annotation review queue or pipeline. The annotation review queue provides various features to maintain a high level of quality, conformity, and uniformity in the labels produced by the labelers for a particular project. In an example embodiment, the annotation review queue provides a queue-based review and an open review. A queue-based review refers to an interface of the automated content annotation workflow platform presented to users after an administrative user configures the review queue to randomly distribute labels for review to a select group of users within a project. A user can perform the following actions in a queue-based review: 1) review a label and vote the previously-applied label up (approved/accepted) or down (disapproved/declined), or 2) modify the previously-applied label. An open review refers to a review interface of the automated content annotation workflow platform presented to users after an administrative user clicks on a row in the activity list within a project. The open review presents a streamlined and transparent way to review, modify, copy, and re-enqueue labeled content data and track the labeling progress. A user can perform the following actions in an open review mode: 1) modify a review, 2) modify a label, 3) copy a label URL, or 4) set a label as a benchmark.

In a particular example embodiment, the annotation review queue is completely separate and distinct from the labeling queue. In an example embodiment of the automated content annotation workflow platform, the annotation review queue is configured to abide by the following rules to ensure that labeling and reviewing operations can happen concurrently while eliminating the risk of users' interfering with each other's work: 1) only content data that have been labeled or skipped are entered into the review queue; and 2) each labeled asset in a reviewer's queue is unique so that only one user may perform a review on a labeled image. A label in the review queue can be reviewed by more than one user, but never more than once by the same user. Once a label is reviewed by the predetermined number of users, via the queue-based review or open review, the label will leave the review queue so the label will not be reviewed again. If a particular project does not need to have 100% of the project's labeled content data reviewed, the user can adjust the percentage of labels to be reviewed by updating a settings interface. In this manner, the user can set the percentage of labels that will enter the review queue. As part of the annotation review queue of an example embodiment, labels can be in one of several status conditions: 1) Unreviewed—e.g., labels where upvotes and downvotes cancel each other out; 2) Accepted—labels where the majority upvoted; 3) Declined—labels where the majority downvoted; and 4) Ambiguous—no reviews at all.

Figure 2:
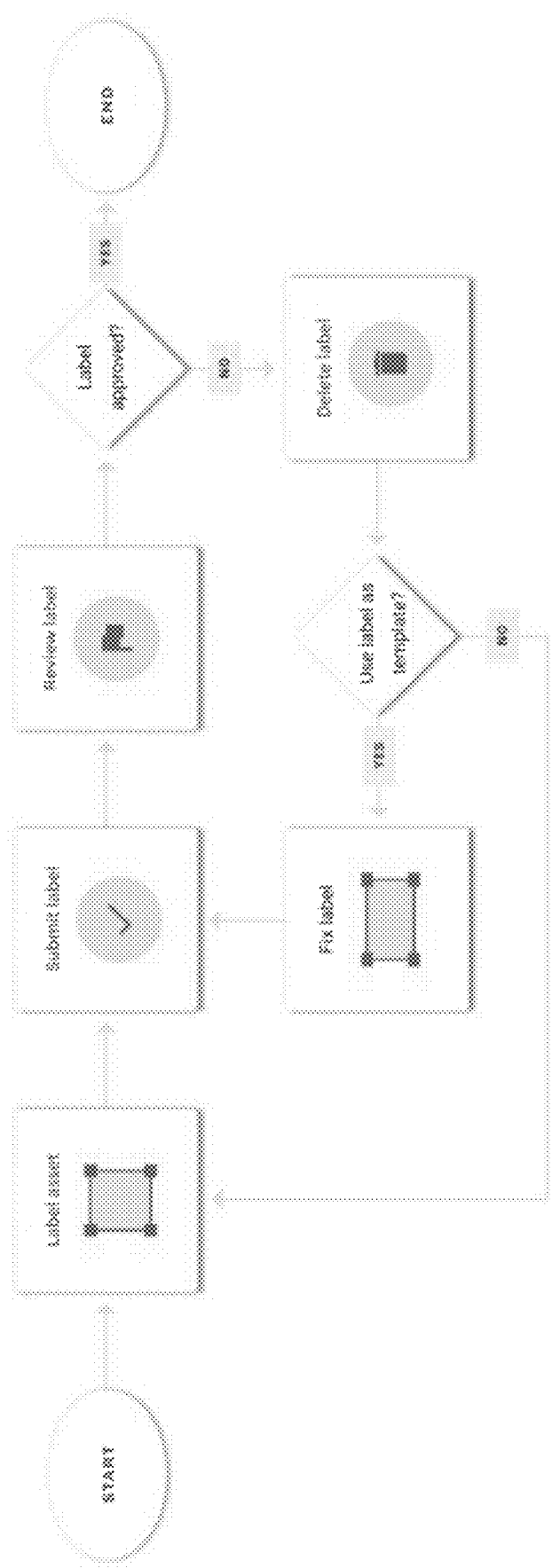
FIG. 2 illustrates a process in an example embodiment of the automated content annotation workflow platform for reviewing and relabeling a content item in the automated content annotation workflow.

Referring to FIG. 2, sometimes a user may need to relabel a content data item because the label does not get approved in the label review process (described above), the project ontology has been adjusted, and/or the consensus or benchmarks score (described below) for the label are lower than expected or allowed. In an example embodiment, a user can relabel and asset by: 1) selecting a labels tab of the user interface of the platform, 2) select the data row the user wishes to relabel, and 3) delete the label. When deleting a label, the user has two options: a) delete the existing annotation, or 2) use the annotation as a template for the next person to label the asset. When a label on an asset is deleted by a user, the asset is automatically added back to the label queue and randomly distributed to a member in a project to be relabeled.

Quality Assurance

An example embodiment of the automated content annotation workflow platform provides important additional tools to facilitate the quality assurance of the asset labeling process. These additional tools include a consensus and benchmarks feature with related scoring and workflow processing. These features of the example embodiment are described below.

Consensus is a QA tool of the automated content annotation workflow platform that compares a single label on an asset to all of the other labels on that asset. Once an asset has been labeled more than once, a consensus score can be automatically calculated. The consensus score corresponds to a mathematical level of conformity or agreement of the single label to other labels on the asset. Consensus works in real time so users can take immediate and corrective actions towards improving their training data and model performance.

Benchmarks is a QA tool of the automated content annotation workflow platform that automatically compares all labels on an asset to a "gold standard" or other pre-defined labeling standard that can be pre-configured. Once an asset with a benchmark label gets a human- or computer-generated label, a benchmark score can be automatically calculated. To mark a label as a benchmark, the user can select a label and the selected label will be marked with a gold star to indicate the label is a benchmark. The benchmark score corresponds to a mathematical level of conformity or agreement of the labels on an asset to a pre-defined and configurable labeling standard.

In the example embodiment of the automated content annotation workflow platform, the methodology for calculating the consensus score and the benchmark score is similar, except with regard to the entity to which the labels are compared (e.g., the reference labels). The benchmarks feature is implemented by interspersing data to be labeled, for which there is a benchmark label, to each person labeling (each labeler). These labeled data are compared against their respective benchmark (e.g., the reference labels) and an accuracy score between 0 and 100 percent is calculated. When a label is created or updated, the benchmarks score can be recalculated as long as there is one label on the data row. If a label gets deleted, no benchmark score will appear for that data row. In an example embodiment, calculating conformity or agreement for the polygons of a label relative to the reference label can include a mathematical correlation calculation (e.g., a well-known Intersection-over-Union process can be used to determine conformity or agreement) and a series of averages to determine the final level of conformity or agreement between a label of an asset and a reference label.

In the example embodiment of the automated content annotation workflow platform, there can be three global classification types supported for the consensus and benchmarks features: radio, checklist, and dropdown. The calculation method for each classification type is different. One commonality, however, is that if two classifications of the same type are compared and there are no corresponding selections between the two classifications at all, the level of conformity or agreement will be 0%.

A radio classification can only have one selected answer. Therefore, the level of conformity or agreement between two radio classifications will either be 0% or 100%. 0% means no agreement and 100% means agreement.

A checklist classification can have more than one selected answer, which makes the agreement calculation a little more complex. The agreement between two checklist classifications is generated by dividing the number of overlapping answers by the number of selected answers.

A dropdown classification can have only one selected answer, however the answer choices can be nested. The calculation for dropdown is similar to that of checklist classification, except that the level of conformity or agreement calculation divides the number of overlapping answers by the total depth of the selection (how many levels). Answers nested under different top-level classifications can still have overlap if the classifications at the next level match. On the flip side, answers that do not match exactly can still have overlap if they are under the same top-level classification.

An overview tab displays the consensus scores across all labels in the project. The x-axis indicates the agreement percentage and the y-axis indicates the label count. A consensus column in the activity table contains the agreement score for each label and how many labels are associated with that score. When a user clicks on the consensus icon, the activity table will automatically apply the correct filter to view the labels associated with that consensus score. When a user clicks on an individual labeler in the performance tab, the consensus column reflects the average consensus score for that labeler.

Benchmark labels are marked with a gold star in the activity table under a labels tab. Under the labels tab, there is also a benchmarks table where a user can see a list of all the benchmarks labels for that project. A "View Results" feature enables the user to see all labels associated with that benchmark label. When the benchmarks tool is active for a particular project, the individual performance section under the performance tab will display a benchmarks column that indicates the average benchmark score for that labeler.

Automation

An example embodiment of the automated content annotation workflow platform provides important tools to facilitate the automation of the asset labeling process. In particular, the platform provides: a model-assisted labeling workflow, a real-time human-in-the-loop labeling workflow, and an automated labeling queue system.

Figure 3:
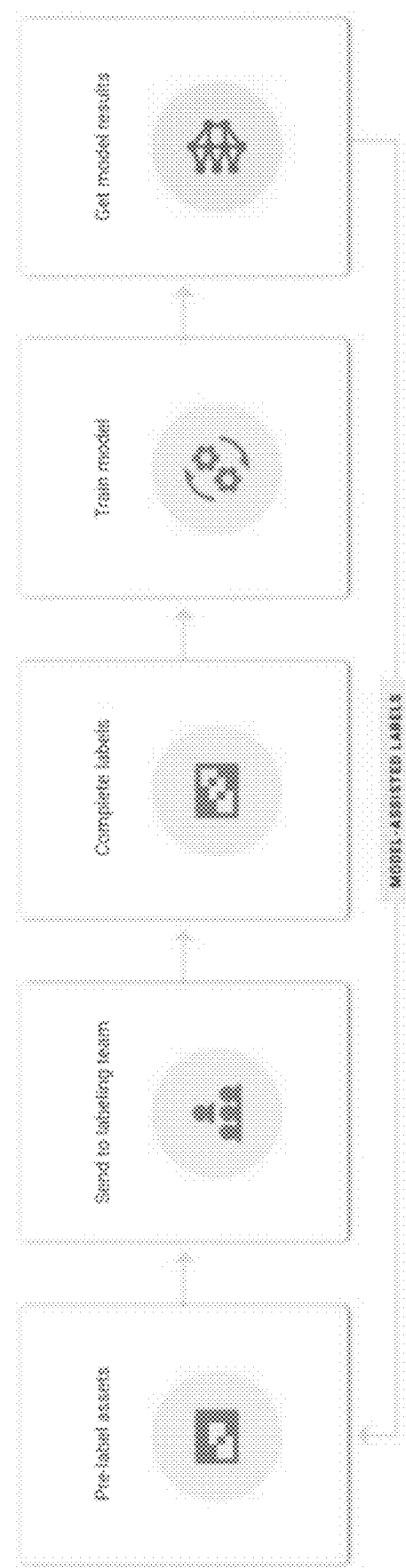
FIG. 3 illustrates a process in an example embodiment of the automated content annotation workflow platform for model-assisted labeling.

Referring to FIG. 3, the example embodiment of the automated content annotation workflow platform provides a model-assisted labeling workflow. The model-assisted labeling workflow in the automated content annotation workflow platform allows a user to import computer-generated predictions and load them as editable features on an asset. This can be a useful tool for speeding up the labeling process and supporting human labeling efforts. In the example embodiment, model-assisted labeling supports the following label types: masks, bounding boxes, polygons, polylines, and points. The predictions can be imported into the platform in a variety of formats including a newline delimited JSON (NDJSON) format. Each prediction can be assigned a universal unique identifier (UUID). A mask prediction can include a mask color in the import file that should match the corresponding mask color on an asset image. Vector predictions, including those for a bounding box, polygon, point, and polyline predictions, can be attached to a data row of an asset. When an asset is loaded in the labeling interface, any predictions for that asset will show up as editable features for the user. Predictions can be loaded on an asset when the following conditions are met: the model-assisted labeling feature is enabled, there are predictions created for the data rows, and there are no non-prediction annotations that have already been created by the user on the data rows.

Figure 4:
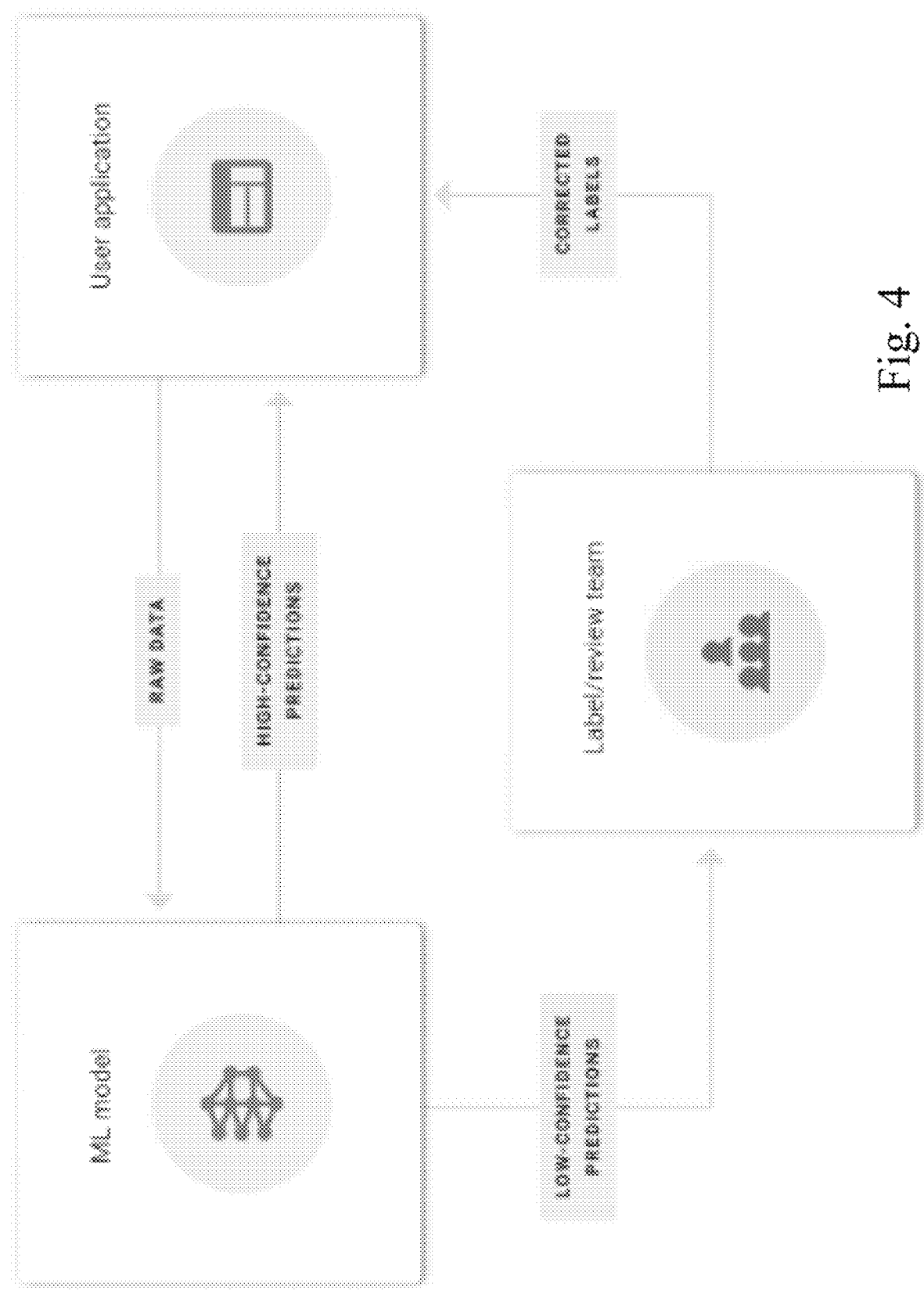
FIG. 4 illustrates a process in an example embodiment of the automated content annotation workflow platform for a real-time human-in-the-loop labeling workflow.

Referring to FIG. 4, the example embodiment of the automated content annotation workflow platform provides a real-time human-in-the-loop labeling workflow. The real-time human-in-the-loop labeling workflow provides sever benefits including: a quick turnaround time for labeling, integration of a continuous workflow for a labeling team, and use of human-labeled data to train a computer model or other machine learning system. In the real-time human-in-the-loop labeling workflow, a team of labelers receive a continuous flow of assets to label. If all assets are labeled, the labelers will be advised to wait until new assets are available for labeling by the team members.

Additionally, FIG. 4 illustrates the use of model predictions as part of the workflow for the example embodiment of the automated content annotation workflow platform. As part of training the machine learning (ML) model shown in FIG. 4, training content data can be used to configure the ML model to recognize particular objects, features, or patterns in the content data being analyzed. For an example related to image content, image analysis can be used to identify objects or features of interest in the input image content. Based on the training of the ML model, the ML model can produce predictions of the potential objects, features, or patterns of interest in the content data being analyzed. Object masks or templates (e.g., predicted labels) can be generated from the predictions produced by the ML model. The predicted labels can be used to isolate the features of interest from the remainder of the input content data. The predicted labels can facilitate and improve both an automated labeling workflow and a manual labeling workflow. However, because the quality of these predicted labels (e.g., predicted label quality corresponding to the likelihood that the predicted label produces accurate object or feature classification results) can vary significantly, the example embodiments provide processes for assigning confidence levels to the predicted labels. These confidence levels for the predicted labels can be generated from a variety of sources provided by the automated content annotation workflow platform. For example, these sources can include: validation from another reviewing labeler, consensus from a plurality of labelers using the auto consensus process, comparison against a benchmark, correlation to results produced by an automated labeling process (each described herein), or the like. Given the confidence levels or other ranking criteria for the predicted labels as shown in FIG. 4, the predicted label confidence levels can be used to bifurcate the processing path used as part of the automated content annotation workflow. For example, predicted labels with high confidence levels (e.g. at or above a pre-defined threshold) produced from predictions by the ML model can be provided directly to a user application from the ML model. Predicted labels with low confidence levels (e.g. below a pre-defined threshold) can be directed to a label review team, which can review the predicted label and modify or correct the label to improve the label's corresponding confidence level. Once corrected by the label review team, the modified label can be provided to the user application. Thus, the process of assigning a confidence level to the predicted labels based on consensus or other workflow processes provided by an example embodiment and routing the processing of the predicted labels differently based on the confidence level is a feature provided by the automated content annotation workflow platform as disclosed herein.

The automated content annotation workflow platform also enables users to import predicted labels into the platform. In this manner, a labeling team is able to validate or correct the imported predicted labels and to determine the level of correlation between the labeling team and the predictions produced by the ML model. An example embodiment also provides an API to import human labeled data for QA review. The predicted labels produced from predictions by the ML model also provide several other benefits as well. The predicted labels can enable the automated content annotation workflow platform to give hints to the labelers or to direct their attention to portions of the content data that may be of interest. For example, the platform can automatically draw an initial bounding box around an area of interest in the content data. The labeler can adjust the automatically created bounding box to better fit an object or feature in the content data. Additionally, based on the predicted labels, the platform can automatically provide an initial suggestion of one or more identifiers that may correspond to a particular object or feature in the content data. The labeler can be prompted to pick an automatically suggested identifier or classification corresponding to the particular object or feature. In a particular example of image content data representing a field with organic material, the platform can use the predicted labels to prompt a labeler to identify portions of the organic material that are crops and other portions that are weeds. Many other examples are also enabled by the predicted labels produced from predictions by the ML model of the automated content annotation workflow platform.

Figure 5:
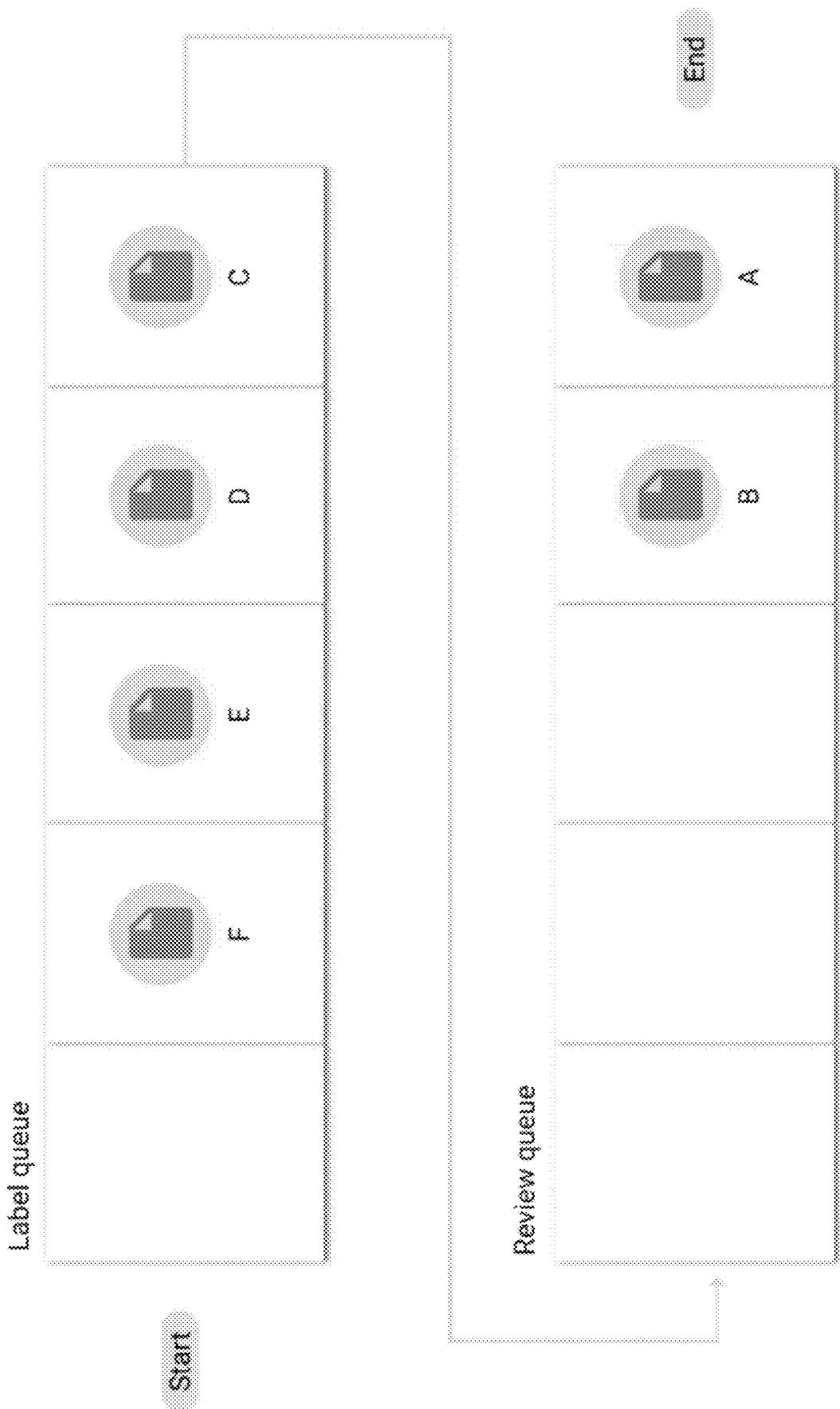
FIG. 5 illustrates an example of assets in an automated labeling queue of the automated content annotation workflow platform.

Referring to FIG. 5, the example embodiment of the automated content annotation workflow platform provides an automated labeling queue system. The queue system of the example embodiment enables a user to automate the processes of organizing and distributing content data to labelers and reviewers in a content labeling project. Each project can have one label queue and one optional review queue. When content data is added to a labeling project, those assets are added to the project's label queue. The members of the labeling team can then begin the process of labeling the assets. Every time a label is skipped or submitted in the labeling interface of the automated content annotation workflow platform, the platform automatically de-queues the label. The label queue can be rebuilt every time the project consensus settings are changed, a dataset is attached or detached from a project, a label is deleted, or the label queue is explicitly rebuilt. When the review queue enabled, a pre-defined and customizable percentage of the labels of the project are added to the review queue. As part of the review queue, administrative users can view and modify previously reviewed labels by clicking on the data row from the activity table.

The automated content annotation workflow platform of an example embodiment also provides an application programming interface (API) to enable customization of the automated labeling queue system. By default, each asset in the label queue will be labeled once. However, if a user needs a specific asset to be labeled more than once, the user can use the API to target an individual asset and specify the number of times the asset should get labeled. The automated content annotation workflow platform will automatically re-enter that asset into the label queue and redistribute the asset to active labelers until the asset has received the specified number of labels or the asset has been submitted for labeling the specified number of times.

Figure 6:
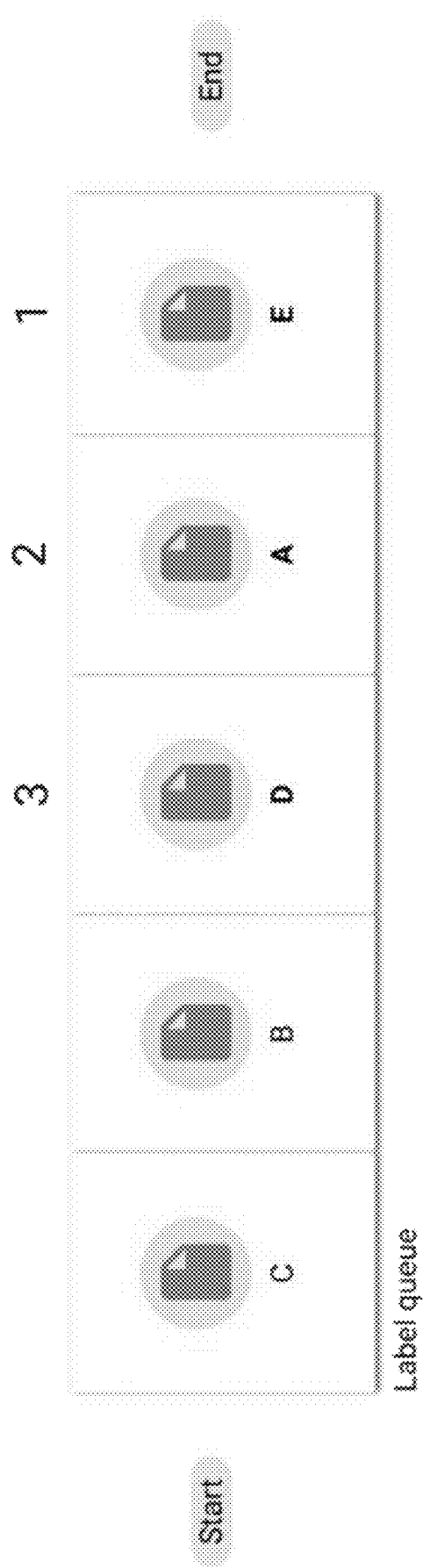
FIGS. 6 through 8 illustrate an example of prioritization of assets in an automated labeling queue of the automated content annotation workflow platform.

If the user needs assets to appear in the label queue in a certain order, the user can assign an individual priority score to each asset. The order of non-prioritized assets in the label queue is not guaranteed. Referring to FIG. 6 for a particular prioritization example, asset E will be labeled first, asset A will be second, and asset D will be third.

Figure 7:
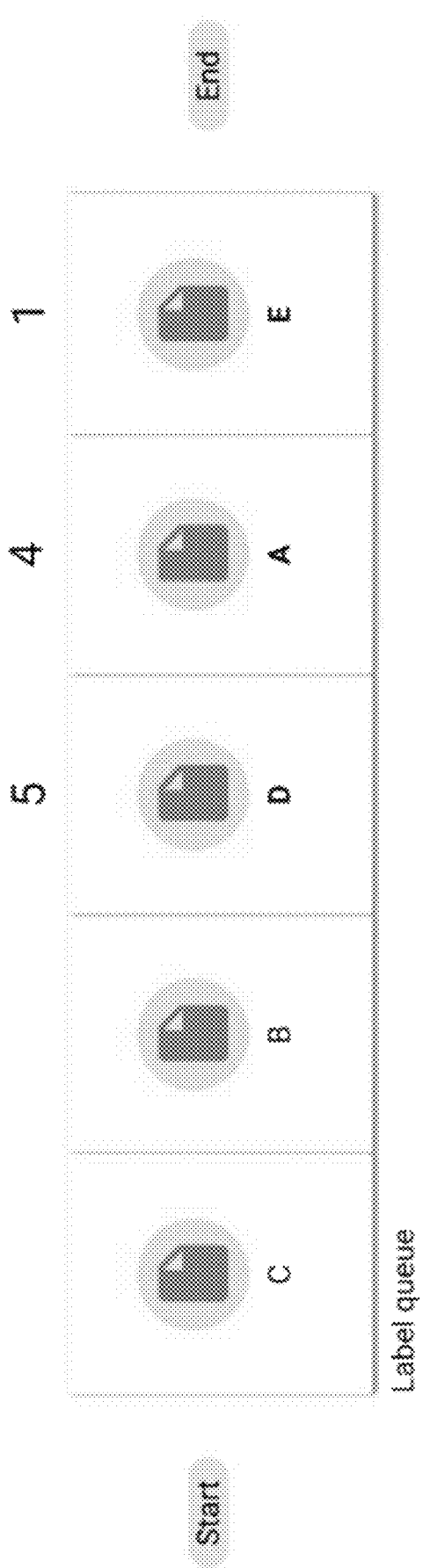

If the user skips prioritization numbers when the prioritization order is set, the label queue will default to the next asset in the priority order. Referring to FIG. 7 for another particular prioritization example, asset E will be labeled first, asset A will be second, and asset D will be third.

Figure 8:
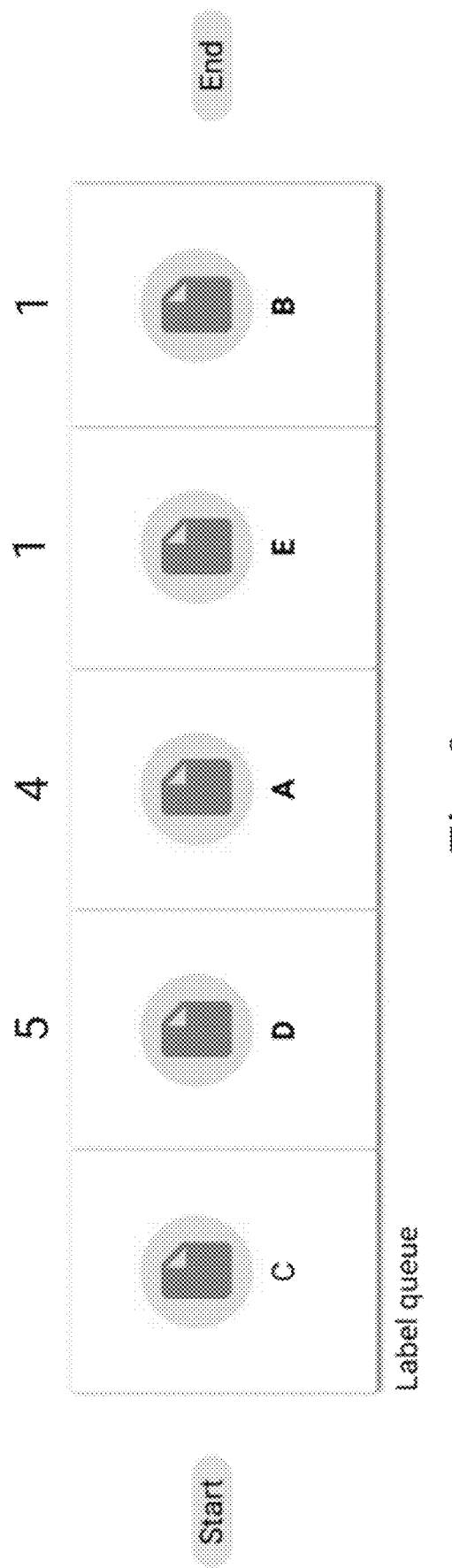

If the user assigns multiple assets with the same priority number without rebuilding the label queue, the priority of the assets will be ordered lexicographically. Referring to FIG. 8 for another particular prioritization example, asset B will be labeled first, asset E will be second, asset A will be third, and asset D will be fourth.

The automated content annotation workflow platform of an example embodiment distributes assets from the label queue in batches to each active individual labeler. When a batch of assets is distributed to an active labeler, the platform "checks out" those assets to that labeler. Once the individual's queue of reserved assets empties, the platform automatically fills the individual's label queue with a new batch of unlabeled assets. If a user starts labeling an asset, then is idle for more than 90 min or logs out, the platform will assign the asset to another active labeler. However, if the original labeler signs back in, the reservation will be refreshed. This may result in two separate labels on the same asset.

The automated content annotation workflow platform of an example embodiment enables users to easily create, install, and configure a custom editor to look and feel like the standard platform labeling interface. With a custom editor, for example, a user can label: point clouds, maps, medical DICOM imagery, multiple assets at once, or a variety of other types of content data types. The custom interface can be executed locally at a customer site or executed on a hosting server. The automated content annotation workflow platform of an example embodiment also provides APIs to customize content data imports, prediction imports, label queue or review queue customization, multi-step labeling, and label exports.

Figure 9:
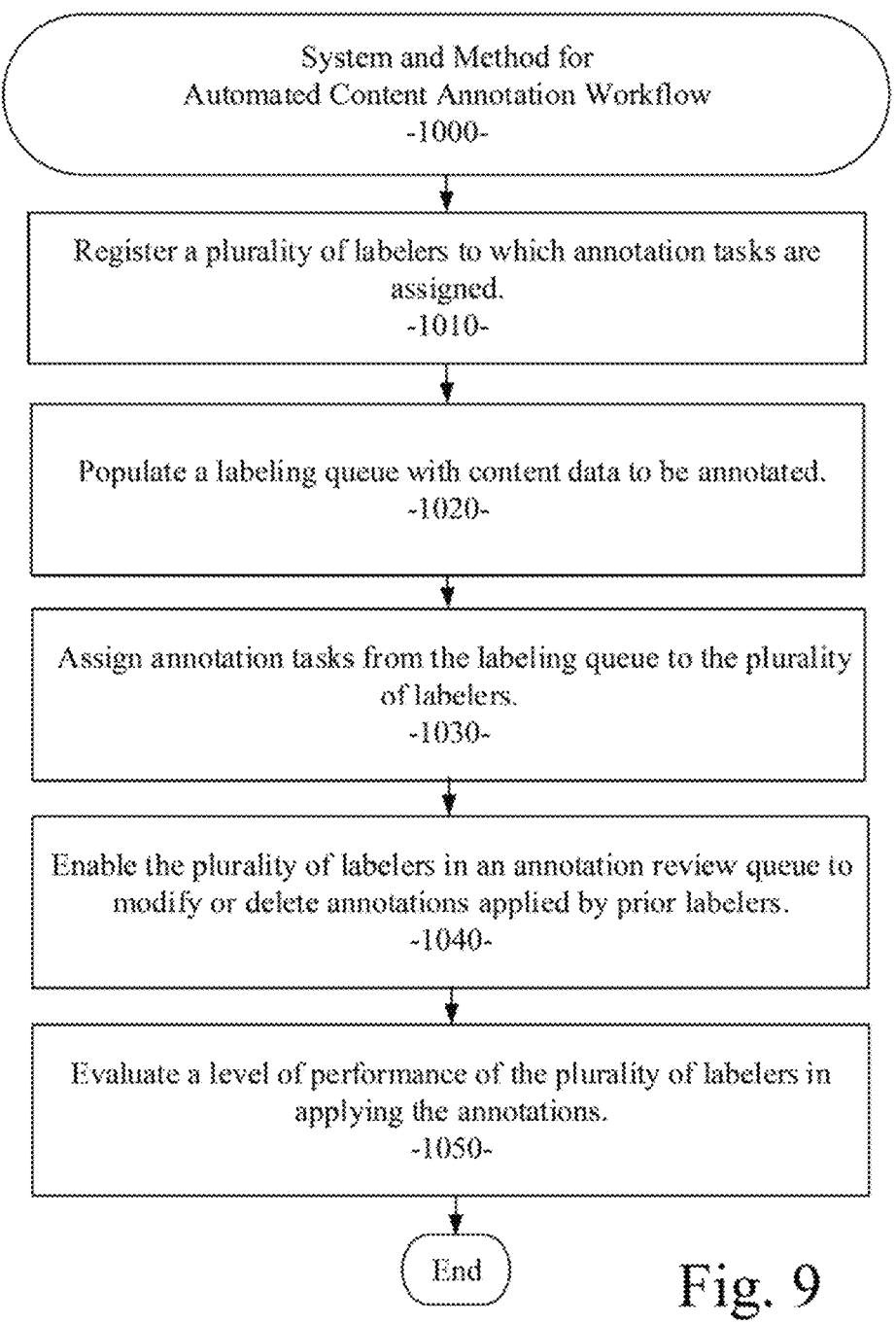
FIG. 9 is a process flow diagram illustrating an example embodiment of a system and method for implementing an automated content annotation workflow.

Referring now to FIG. 9, a flow diagram illustrates an example embodiment of a system and method 1000 for automated content annotation workflow. The example embodiment can be configured for: registering a plurality of labelers to which annotation tasks are assigned (processing block 1010); populating a labeling queue with content data to be annotated (processing block 1020); assigning annotation tasks from the labeling queue to the plurality of labelers (processing block 1030); enabling the plurality of labelers in an annotation review queue to modify or delete annotations applied by prior labelers (processing block 1040); and evaluating a level of performance of the plurality of labelers in applying the annotations (processing block 1050).

Figure 10:
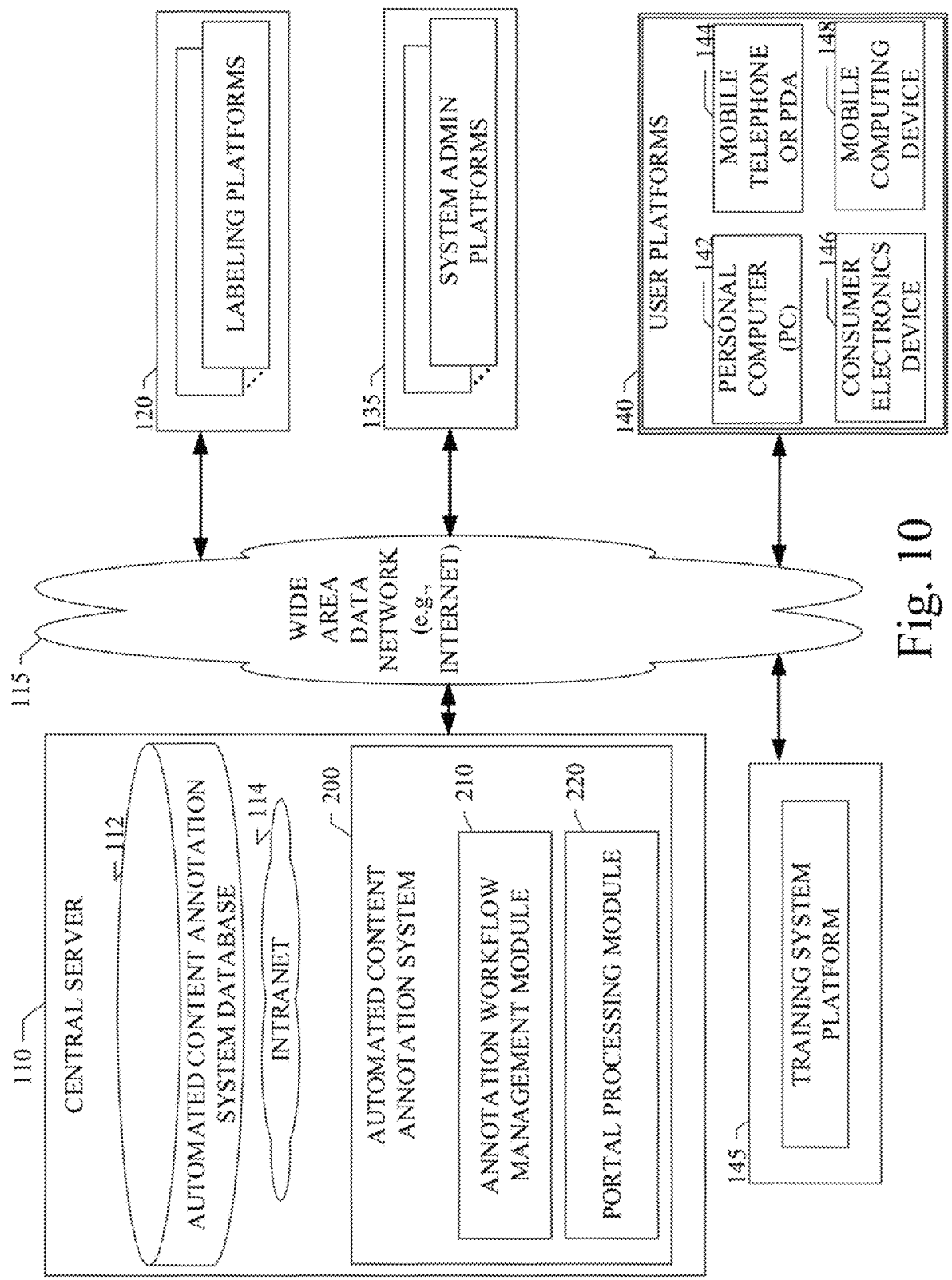
FIG. 10 illustrates an example embodiment of a networked system in which various embodiments may operate.

FIG. 10 illustrates an example embodiment of a networked system in which various embodiments may operate. Referring now to FIG. 10 in an example embodiment, an automated content annotation system 200 can be implemented as described herein to support the automation of the content annotation workflow. In the example embodiment, the automated content annotation system 200 can include an annotation workflow management module 210 as described above. Additionally, the automated content annotation system 200 can include a portal processing module 220 to provide user interfaces, dashboards, administrative controls, and interfaces for managing the labelers and for interfacing with the annotation workflow management module 210 of the automated content annotation system 200.

In the example embodiment as shown in FIG. 10, the automated content annotation system 200 can be deployed on a central server or host site (e.g., a website) 110 to provide a system and method for automated content annotation workflow management. For many on-site labeling projects, a shared server (not shown) can be provided and interfaced with central server 110. For off-site labeling projects, a deployment in the client environment, such as an application (app), can be provided and interfaced with central server 110. Users at the client sites (120, 135, and 140) can be provisioned with and can provide the credentials to access the app and/or the server 110. All configuration for tools can be managed via a user interface. Users, including administrative personnel, can have the option to view app metrics data based on their user roles. In various example embodiments, the automated content annotation system 200 can be hosted by the host site 110 for a networked user at any of the client sites (120, 135, and 140), wherein any of the client sites (120 and 135) can be implemented as a user platform 140. The details of the automated content annotation system 200 and client sites (120, 135, and 140) for an example embodiment are provided herein.

Referring again to FIG. 10, the automated content annotation system 200 can be in network communication with a plurality of client sites (120, 135, and 140). These client sites can include labeling platforms 120 and system administrative platforms 135. The labeling platforms 120 can include access portals for content annotation personnel to perform content annotation tasks. The system administrative platforms 135 can include access portals for system administrative personnel to create new accounts or projects, to view the status metrics and trends, and cause the generation of status metrics, trend data, and notifications for on-going labeling workflows.

The automated content annotation system 200 can be configured to provide data communications for the user platforms 140 serving as networked platforms for labelers at labeling platforms 120 and system administrators at system administrative platforms 135. The automated content annotation system 200 can provide content and related annotation information in a digital or computer-readable form to these user platforms 140 via the network 115. The automated content annotation system 200 be also be configured to provide data communications for the training system platforms 145 to enable the networked usage, transfer, or downloading of the annotation data for training an AI application.

One or more of the labeling platforms 120 can be provided by one or more third party providers operating at various locations in a network ecosystem. The labeling platforms 120 and the system administrative platforms 135 can be implemented from a variety of different types of client devices, such as user platforms 140. The user platforms 140 may communicate and transfer data and information in the data network ecosystem shown in FIG. 10 via a wide area data network (e.g., the Internet) 115. Various components of the host site 110 can also communicate internally via a conventional intranet or local area network (LAN) 114.

Networks 115 and 114 are configured to couple one computing device with another computing device. Networks 115 and 114 may be enabled to employ any form of computer readable media for communicating information from one electronic device to another. Network 115 can include the Internet in addition to LAN 114, wide area networks (WANs), direct connections, such as through a universal serial bus (USB) port, other forms of computer-readable media, or any combination thereof. On an interconnected set of LANs, including those based on differing architectures and protocols, a router and/or gateway device acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those of ordinary skill in the art. Furthermore, remote computers and other related electronic devices can be remotely connected to either LANs or WANs via a wireless link, WiFi, Bluetooth™, satellite, or modem and temporary telephone link.

The labeling platforms 120 and system administrative platforms 135 may produce and consume any of a variety of network transportable digital data. The network transportable digital data can be transported in any of a family of file formats and associated mechanisms usable to enable a host site 110 to exchange data with the labeling platforms 120 and the system administrative platforms 135.

In a particular embodiment, a user platform 140 with one or more client devices enables a user to access data provided by the automated content annotation system 200 via the host 110 and network 115. Client devices of user platform 140 may include virtually any computing device that is configured to send and receive information over a network, such as network 115. Such client devices may include portable devices 144, such as, cellular telephones, smart phones, camera phones, Personal Digital Assistants (PDAs), handheld computers, wearable computers, tablet computers, integrated devices combining one or more of the preceding devices, and the like. The client devices may also include other computing devices, such as personal computers 142, multiprocessor systems, microprocessor-based or programmable consumer electronics, network PC's, and the like. The client devices may also include other processing devices, such as consumer electronic (CE) devices 146 and/or mobile computing devices 148, which are known to those of ordinary skill in the art. As such, the client devices of user platform 140 may range widely in terms of capabilities and features. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and/or send digital information. In other embodiments, mobile devices can be configured with applications (apps) with which the functionality described herein can be implemented.

Referring again to FIG. 10, the automated content annotation system 200 of an example embodiment is shown to include an automated content annotation system database 112. The database 112 can be used to retain a variety of information data sets including, but not limited to, content source information, metadata, annotation data, labeler data, status, metrics, and the like. It will be apparent to those of ordinary skill in the art that the automated content annotation system database 112 can be locally resident at the host site 110 or remotely located at other server locations or stored in network cloud storage.

Referring again to FIG. 10, host site 110 of an example embodiment is shown to include the automated content annotation system 200. In an example embodiment, automated content annotation system 200 can include an annotation workflow management module 210 and a portal processing module 220. Each of these modules can be implemented as software components executing within an executable environment of automated content annotation system 200 operating on host site 110 or user platform 140. The annotation workflow and user interfaces implemented by each of these modules of an example embodiment is described in detail above in connection with the figures provided herein.

Figure 11:
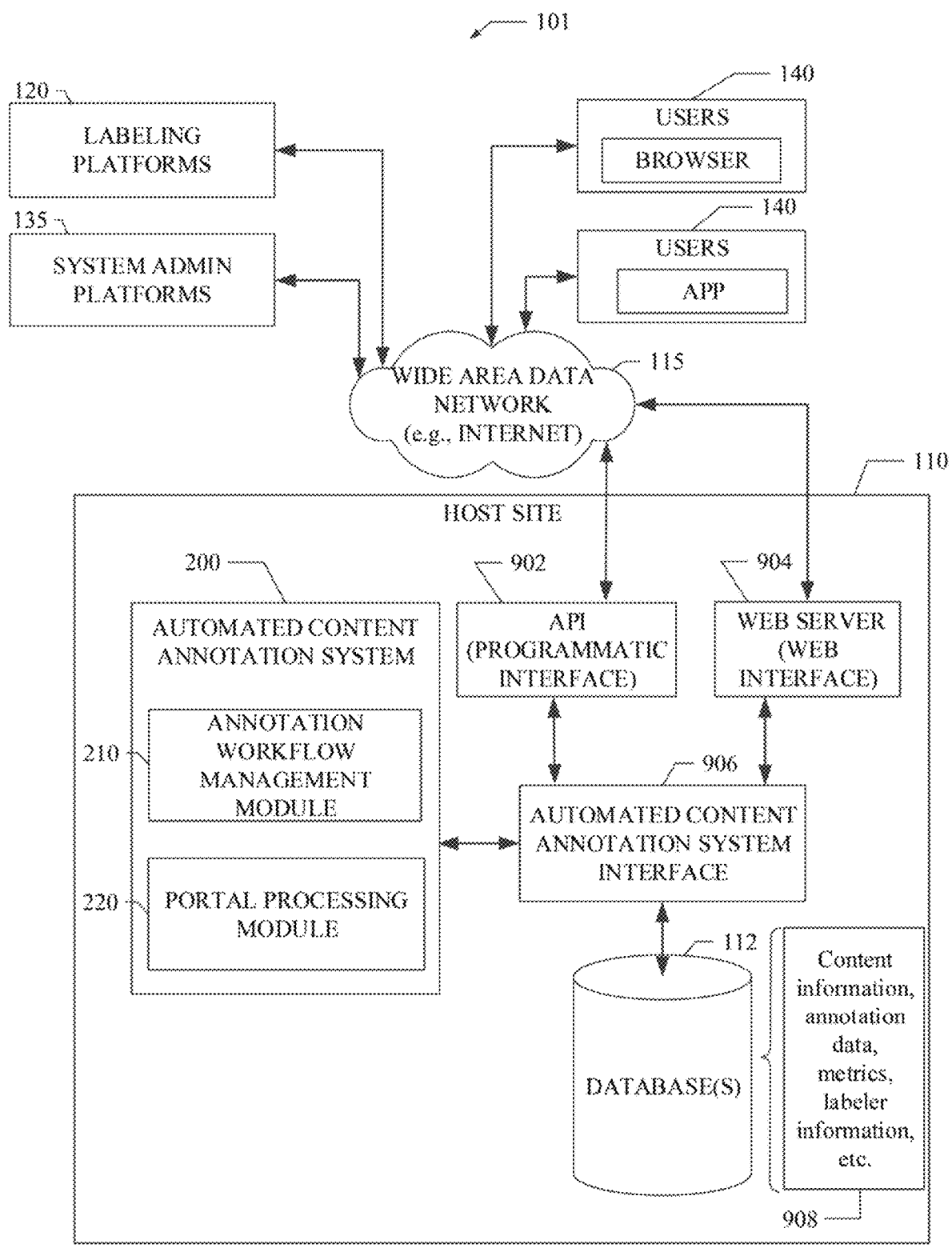
FIG. 11 illustrates another example embodiment of a networked system in which various embodiments may operate.

FIG. 11 illustrates another example embodiment 101 of a networked system in which various embodiments may operate. In the example embodiment illustrated, the host site 110 is shown to include the automated content annotation system 200. The automated content annotation system 200 is shown to include the annotation workflow management module 210 and the portal processing module 220, as described above. In a particular embodiment, the host site 110 may also include a web server 904, having a web interface with which users may interact with the host site 110 via a user interface or web interface. The host site 110 may also include an application programming interface (API) 902 with which the host site 110 may interact with other network entities on a programmatic or automated data transfer level. The API 902 and web interface 904 may be configured to interact with the automated content annotation system 200 either directly or via an interface 906. The automated content annotation system 200 may be configured to access a data storage device 112 either directly or via the interface 906.

Figure 12:
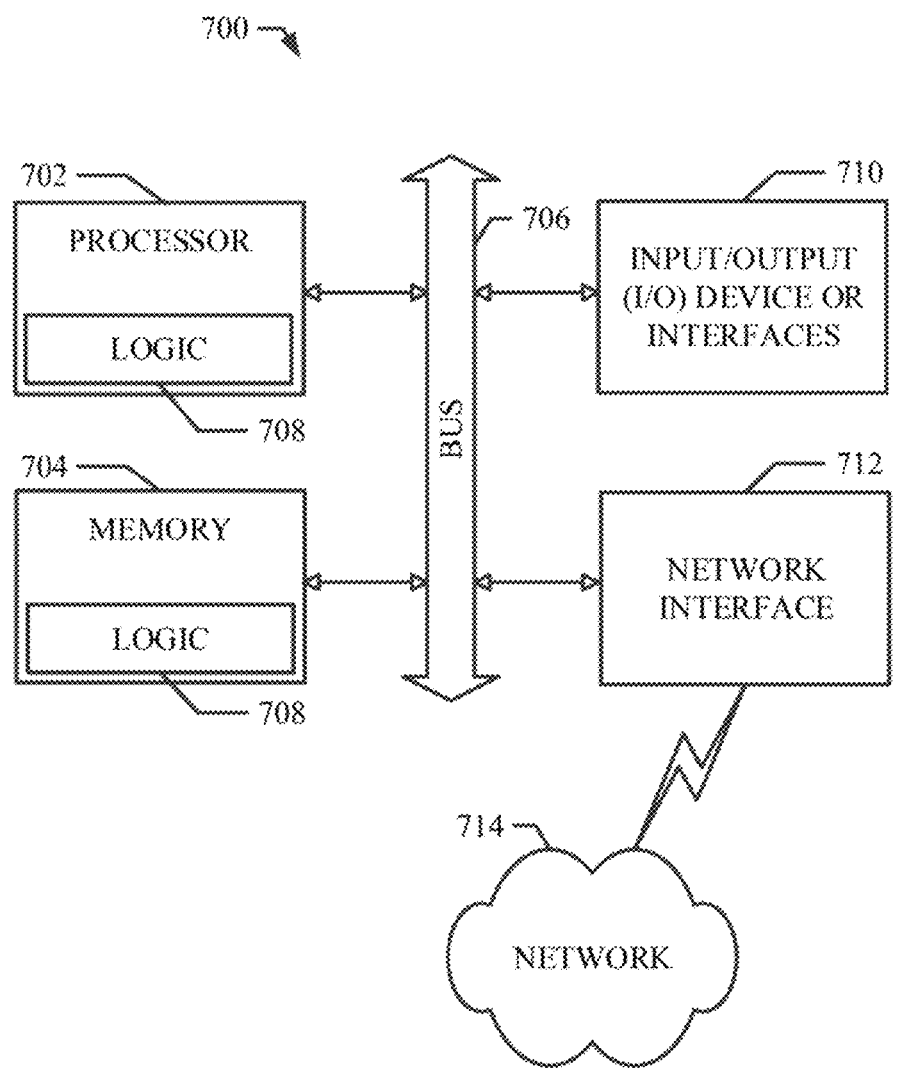
FIG. 12 shows a diagrammatic representation of a machine in the example form of a computer system within which a set of instructions when executed may cause the machine to perform any one or more of the methodologies discussed herein.

FIG. 12 shows a diagrammatic representation of a machine in the example form of a computer system, mobile computing system, and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a mobile device, a web appliance, or any machine capable of executing a set of instructions (sequential or otherwise) or activating processing logic that specifies actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computer system, mobile computing system, and/or communication system 700 includes a data processor 702 (e.g., a System-on-a-Chip (SoC), general processing core, graphics core, and optionally other processing logic) and a memory 704, which can communicate with each other via a bus or other data transfer system 706. The computer system, mobile computing system, and/or communication system 700 may further include various input/output (I/O) devices and/or interfaces 710, such as a touchscreen display and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G), 5th (5G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication mechanisms by which information may travel between the computer system, mobile computing system, and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the computer system, mobile computing system, and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that stores the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

As described herein for various example embodiments, a system and method for automated content annotation workflow are disclosed. In the various example embodiments described herein, a computer-implemented tool or software application (app) as part of an automated content annotation system is described to automate and improve content annotation. As such, the various embodiments as described herein are necessarily rooted in computer and network technology and serve to improve these technologies when applied in the manner as presently claimed. In particular, the various embodiments described herein improve the use of servers or mobile device technology and data network technology in the context of automated content annotation via electronic means.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An automated content annotation workflow system for improving the volume and quality of training data for an artificial intelligence (AI) system, the system comprising:
a data processor; and
an automated content annotation workflow platform, executable by the data processor, the automated content annotation workflow platform being configured to:
    register a plurality of labelers to which annotation tasks are assigned;
    populate, by use of the data processor, a labeling queue with content data to be annotated;
    assign, by use of the data processor, annotation tasks from the labeling queue to the plurality of labelers and prompt the plurality of labelers to apply annotations to objects identified in the content data;
    enable a plurality of labelers in an annotation review queue to modify or delete annotations applied by prior labelers;
    use a trained machine learning model to produce predictions of potential objects, features, or patterns of interest in the content data being analyzed by the plurality of labelers;
    generate, by use of the data processor, predicted annotations from the predictions produced by the trained machine learning model;
    enable the plurality of labelers to review and modify the predicted annotations;
    evaluate, by use of the data processor, a level of performance of the plurality of labelers in applying the annotations; and
    export annotations having a corresponding confidence level at or above a pre-defined threshold to a machine learning training system using programmatic data transfers.

2. The automated content annotation workflow system of claim 1 wherein the predicted annotations are object masks or templates.

3. The automated content annotation workflow system of claim 1 being further configured to provide a tool bar with which the plurality of labelers can select an object class appropriate for an item identified in the content data.

4. The automated content annotation workflow system of claim 1 being further configured to display a level of progress and labeling performance for at least one of the plurality of labelers.

5. The automated content annotation workflow system of claim 1 being further configured to enable the plurality of labelers in the annotation review queue to review a particular annotation applied by a prior labeler.

6. The automated content annotation workflow system of claim 1 being further configured to generate a consensus score based on a comparison of a single annotation applied to a particular item of the content data by a particular labeler of the plurality of labelers with other annotations applied to the same particular item of the content data by others of the plurality of labelers.

7. The automated content annotation workflow system of claim 1 being further configured to enable a user to select a particular annotation that is used as a benchmark, which is compared with other annotations.

8. The automated content annotation workflow system of claim 1 wherein the labeling queue and the annotation review queue are separate and distinct queues.

9. The automated content annotation workflow system of claim 1 wherein the content data is of a type from the group consisting of: images, textual content, numerical content, audio data, chemical signatures, and organic signatures.

10. A method for improving the volume and quality of training data for an artificial intelligence (AI) system, the method comprising:
- registering, by use of a data processor, a plurality of labelers to which annotation tasks are assigned;
- populating, by use of the data processor, a labeling queue with content data to be annotated;
- assigning, by use of the data processor, annotation tasks from the labeling queue to the plurality of labelers and prompt the plurality of labelers to apply annotations to objects identified in the content data;
- enabling, by use of the data processor, a plurality of labelers in an annotation review queue to modify or delete annotations applied by prior labelers;
- using a trained machine learning model to produce predictions of potential objects, features, or patterns of interest in the content data being analyzed by the plurality of labelers;
- generating, by use of the data processor, predicted annotations from the predictions produced by the trained machine learning model;
- enabling the plurality of labelers to review and modify the predicted annotations;
- evaluating, by use of the data processor, a level of performance of the plurality of labelers in applying the annotations; and
- exporting annotations having a corresponding confidence level at or above a pre-defined threshold to a machine learning training system using programmatic data transfers.

11. The method of claim 10 wherein the predicted annotations are object masks or templates.

12. The method of claim 10 including providing a tool bar with which the plurality of labelers can select an object class appropriate for an item identified in the content data.

13. The method of claim 10 including displaying a level of progress and labeling performance for at least one of the plurality of labelers.

14. The method of claim 10 including enabling the plurality of labelers in the annotation review queue to review a particular annotation applied by a prior labeler.

15. The method of claim 10 including generating a consensus score based on a comparison of a single annotation applied to a particular item of the content data by a particular labeler of the plurality of labelers with other annotations applied to the same particular item of the content data by others of the plurality of labelers.

16. The method of claim 10 including enabling a user to select a particular annotation that is used as a benchmark, which is compared with other annotations.

17. The method of claim 10 wherein the labeling queue and the annotation review queue are separate and distinct queues.

18. The method of claim 10 wherein the content data is of a type from the group consisting of: images, textual content, numerical content, audio data, chemical signatures, and organic signatures.

19. A non-transitory machine-useable storage medium embodying instructions for improving the volume and quality of training data for an artificial intelligence (AI) system, the instructions when executed by a machine, cause the machine to:
- register, by use of a data processor, a plurality of labelers to which annotation tasks are assigned;
- populate, by use of the data processor, a labeling queue with content data to be annotated;
- assign, by use of the data processor, annotation tasks from the labeling queue to the plurality of labelers and prompt the plurality of labelers to apply annotations to objects identified in the content data;
- enable, by use of the data processor, a plurality of labelers in an annotation review queue to modify or delete annotations applied by prior labelers;
- use a trained machine learning model to produce predictions of potential objects, features, or patterns of interest in the content data being analyzed by the plurality of labelers;
- generate, by use of the data processor, predicted annotations from the predictions produced by the trained machine learning model;
- enable the plurality of labelers to review and modify the predicted annotations;
- evaluate, by use of the data processor, a level of performance of the plurality of labelers in applying the annotations; and
- export annotations having a corresponding confidence level at or above a pre-defined threshold to a machine learning training system using programmatic data transfers.

20. The non-transitory machine-useable storage medium embodying the instructions of claim 19 wherein the content data is of a type from the group consisting of: images, textual content, numerical content, audio data, chemical signatures, and organic signatures.

* * * * *